United States Patent
Smith et al.

(10) Patent No.: US 9,506,430 B2
(45) Date of Patent: Nov. 29, 2016

(54) CHARGE AIR COOLER COMPONENT DIAGNOSTICS

(71) Applicant: Ford Global Technologies, LLC, Dearborn, MI (US)

(72) Inventors: Craig Alan Smith, Lake Orion, MI (US); Joseph Patrick Whitehead, Belleville, MI (US); Chris Paul Glugla, Macomb, MI (US); Charles Allen Cockerill, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 785 days.

(21) Appl. No.: 13/706,090

(22) Filed: Dec. 5, 2012

(65) Prior Publication Data

US 2014/0150756 A1    Jun. 5, 2014

(51) Int. Cl.
| | | |
|---|---|---|
| *F02B 33/00* | (2006.01) | |
| *F02M 31/20* | (2006.01) | |
| *F02M 35/10* | (2006.01) | |
| *F02B 29/04* | (2006.01) | |

(52) U.S. Cl.
CPC ........ *F02M 31/205* (2013.01); *F02B 29/0418* (2013.01); *F02B 29/0431* (2013.01); *F02B 29/0493* (2013.01); *F02M 35/1038* (2013.01); *F02B 29/0437* (2013.01); *F02M 26/06* (2016.02); *F02M 26/23* (2016.02); *Y02T 10/146* (2013.01)

(58) Field of Classification Search
CPC ........... F02M 31/205; F02M 35/1038; F02M 25/0709; F02M 25/0727; Y02T 10/144; Y02T 10/40; Y02T 10/146; F02B 29/0418; F02B 29/0431; F02B 29/0493; F02B 29/0437; B60K 11/08; B60K 11/04; B60K 11/06; B60K 11/10; B60K 11/02; F01P 3/20; F01P 11/04; F01P 11/06; F01P 2007/146; F01P 2060/08
USPC .................. 60/286; 123/563, 568.11, 41.04; 180/68.1
See application file for complete search history.

(56) References Cited

U.S. PATENT DOCUMENTS

| | | | | |
|---|---|---|---|---|
| 4,513,729 | A * | 4/1985 | Udd ............................... | 123/563 |
| 4,916,902 | A * | 4/1990 | Pratt et al. ...................... | 60/599 |
| 5,152,144 | A * | 10/1992 | Andrie ............................ | 60/599 |
| 6,272,860 | B1 * | 8/2001 | Klein ......................... | F01N 3/22 |
| | | | | 60/602 |
| 6,588,380 | B2 * | 7/2003 | Ries-Mueller ............. | 123/41.05 |

(Continued)

FOREIGN PATENT DOCUMENTS

JP    2009215904 A    9/2009

OTHER PUBLICATIONS

Cockerill, Charles A. et al., "Charge Air Cooler Control System and Method," U.S. Appl. No. 13/567,979, filed Aug. 6, 2012, 33 pages.

(Continued)

*Primary Examiner* — Patrick Maines
(74) *Attorney, Agent, or Firm* — Julia Voutyras; Alleman Hall McCoy Russell & Tuttle LLP (57) ABSTRACT

Embodiments for a charge air cooler are provided. In one example, a method comprises adjusting an operating parameter in response to a degraded grille shutter, the degraded grille shutter determined based on a temperature difference across a charge air cooler. In this way, degradation of the charge air cooler or engine may be reduced.

12 Claims, 3 Drawing Sheets

(56) References Cited

U.S. PATENT DOCUMENTS

| | | | |
|---|---|---|---|
| 7,143,580 B2* | 12/2006 | Ge | F02B 29/0418 123/563 |
| 7,886,724 B2 | 2/2011 | Tai et al. | |
| 8,195,311 B2 | 6/2012 | Karpman et al. | |
| 2006/0095178 A1* | 5/2006 | Guilfoyle | B60K 11/085 701/36 |
| 2006/0102399 A1* | 5/2006 | Guilfoyle | B60K 11/04 180/68.1 |
| 2007/0199319 A1* | 8/2007 | Bender | F02B 29/0456 60/599 |
| 2009/0050117 A1* | 2/2009 | Tai | F02B 29/0412 123/542 |
| 2010/0050997 A1 | 3/2010 | Huber et al. | |
| 2010/0077995 A1 | 4/2010 | Buia et al. | |
| 2011/0114066 A1* | 5/2011 | Vasallo | F02D 41/0007 123/564 |
| 2011/0125361 A1* | 5/2011 | Weber | F01P 11/18 701/31.4 |
| 2011/0137530 A1* | 6/2011 | Kerns | 701/49 |
| 2011/0246023 A1* | 10/2011 | Lockwood | F01P 7/10 701/36 |
| 2012/0247709 A1* | 10/2012 | Soldan | F28F 27/00 165/11.1 |
| 2013/0255603 A1* | 10/2013 | Pursifull | F01P 11/16 123/41.15 |
| 2013/0255604 A1* | 10/2013 | Rollinger | F01P 7/048 123/41.15 |
| 2014/0110488 A1* | 4/2014 | Surnilla et al. | 236/49.1 |
| 2015/0149043 A1* | 5/2015 | Macfarlane | F01P 7/12 701/49 |
| 2016/0131057 A1* | 5/2016 | Lahti | F02D 41/0077 701/103 |
| 2016/0131089 A1* | 5/2016 | Lahti | F02M 25/0753 60/605.2 |
| 2016/0194999 A1* | 7/2016 | Hakeem | F01P 7/10 123/41.05 |

OTHER PUBLICATIONS

Glugla, Chris Paul et al., "Method for Controlling a Variable Charge Air Cooler," U.S. Appl. No. 13/589,942, filed Aug. 20, 2012, 41 pages.

* cited by examiner

CHARGE AIR COOLER COMPONENT DIAGNOSTICS

FIELD

The present disclosure relates to a charge air cooler for an engine.

BACKGROUND AND SUMMARY

Turbocharged and supercharged engines may be configured to compress ambient air entering the engine in order to increase power. Because compression of the air may cause an increase in air temperature, a charge air cooler may be utilized to cool the heated air, thereby increasing its density and further increasing the potential power of the engine. To maintain the charge air cooler at a desired temperature, and to provide a desired level of cooling to the heated air, ambient air may be directed over the charge air cooler via grille shutters positioned at the front of the vehicle. Further, to reduce the accumulation of condensate in the charge air cooler, which may occur when internal surfaces of the charge air cooler are cooler than the dew point of the compressed air, the charge air cooler may include a valve configured to selectively modulate the volume of the charge air cooler, thus increasing the intake flow velocity through the charge air cooler to remove and/or reduce accumulated condensate. If degradation to either the grille shutters or the variable volume valve occurs, the cooling capacity of the charge air cooler may be reduced, leading to overheating of the engine and associated components under some conditions. Further, due to increased air pressure that may result when the variable volume valve is degraded, the turbocharger may degrade.

The inventors herein have recognized the issues with the above approach and offer a method to at least partly address them. In one embodiment, a method comprises adjusting an operating parameter in response to a degraded grille shutter, the degraded grille shutter determined based on a temperature difference across a charge air cooler.

In one example, degradation of the grille shutters may be determined based a temperature difference across the charge air cooler during steady state operating conditions. For example, the difference between the temperature upstream of the charge air cooler and the temperature downstream of the charge air cooler may be determined and compared to an expected temperature difference for the known conditions. If the measured temperature difference is different that the expected temperature difference, degradation of the grille shutters may be indicated, and various engine operating parameters may be adjusted to reduce engine overheating.

In another example, degradation of the variable volume charge air cooler valve may be determined based on a pressure difference. For example, the pressure downstream of the charge air cooler may be compared to an expected pressure at a given throttle angle and wastegate position (e.g., level of boost), and if the measured pressure is different than expected, degradation may be indicated.

In this way, degradation of charge air cooler components may be identified without the use of additional sensors. By identifying degradation in components that effect charge air cooler temperature and adjusting operating parameters to account for the degradation, overheating of the engine and/or associated components may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
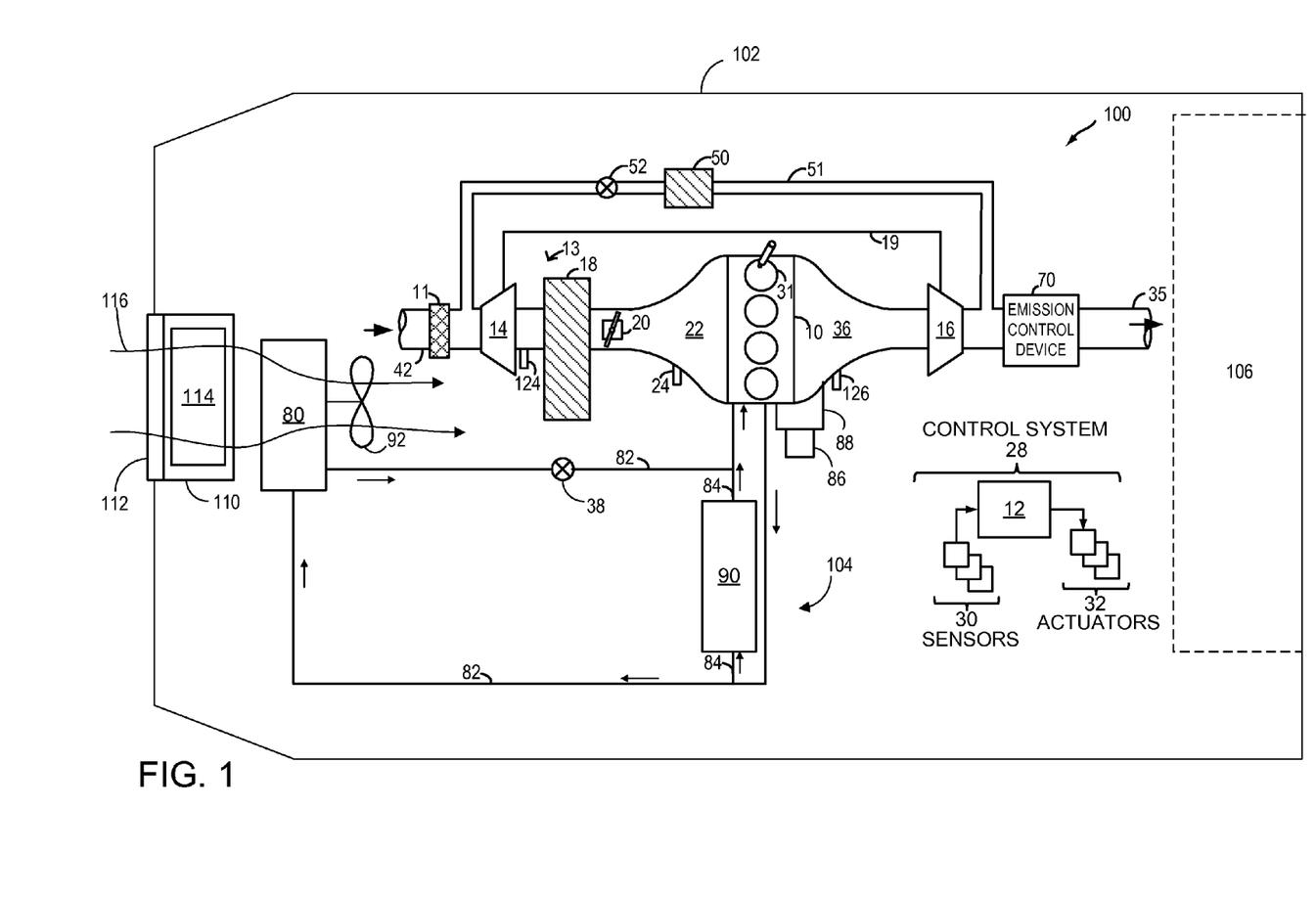
FIG. 1 shows a schematic engine diagram including a charge air cooler and grille shutter system.

To diagnose potential degradation of a grille shutter or variable volume charge air cooler valve, an expected temperature or pressure of the charge air cooler may be compared to measured temperature or pressure. If the measured temperature and/or pressure are not equal to the expected temperature and/or pressure, degradation of the grille shutter position or variable volume valve position may be indicated. If the shutters or valve cannot be moved by cycling of the shutter position or valve position, engine operation may be adjusted to reduce potential engine or charge air cooler degradation resulting from the compromised charge air cooling capacity of the charge air cooler. FIG. 1 shows an engine including a charge air cooler, which may have a variable volume valve illustrated in greater detail in FIG. 2, grille shutter system, and controller including instructions to carry out the method illustrated in FIG. 3.

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient air flow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. Thus, as elaborated herein with reference to FIGS. 2A-2B, the volume of the CAC may be controlled such that condensate formation and engine misfire events are reduced. As described in more detail below, CAC 18 may include a valve to selectively modulate the flow velocity of intake air traveling through the CAC 18 in response to condensation formation within the charge air cooler.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12 described in more detail hereafter. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, throttle inlet pressure, manifold charge temperature, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

Motor vehicle 102 further includes a grille 112 providing an opening (e.g., a grille opening, a bumper opening, etc.) for receiving ambient air flow 116 through or near the front end of the vehicle and into the engine compartment. Such ambient air flow 116 may then be utilized by radiator 80, electric fan 92, and other components to keep the engine and/or transmission cool. Further, the ambient air flow 116 may reject heat from the vehicle air conditioning system and can improve performance of turbo-charged/super-charged engines that are equipped with CAC 18 that reduces the temperature of the air that goes into the intake manifold/engine. The electric fan 92 may be adjusted to further increase or decrease the air flow to the engine components. Furthermore, a dedicated CAC fan may be included in the engine system and used to increase or decrease air flow to the CAC.

Other under hood components (fuel system, batteries, etc.) may benefit from the cooling air flow as well. Thus, grille shutter system 110 and electric fan 92 may assist cooling system 104 in cooling internal combustion engine 10. Grille shutter system 110 comprises one or more grille shutters 114 configured to adjust the amount of air flow received through grille 112.

Grille shutters 114 may cover a front region of the vehicle spanning from just below the hood to the bottom of the bumper, for example. By covering the CAC intake, drag is reduced and entry of external cooling air into the CAC is reduced. In some embodiments, all grille shutters may be moved in coordination by the controller. In other embodiments, grille shutters may be divided into sub-regions and the controller may adjust opening/closing of each region independently. For example, a first region may include grille shutters that largely affect drag while another affects entry of air into the CAC. In one example, the first sub-region may span from just below the hood to the top of the bumper, while the second sub-region may span from the top of the bumper to the bottom of the bumper. Each sub-region may contain one or more grille shutters. In some examples, each region may contain the same number of grille shutters, while in other examples one sub-region contains more than the other. In one embodiment, the first sub-region may contain multiple grille shutters, while the second sub-region contains one grille shutter. In an alternate embodiment, the first sub-region may only contain one grille shutter, while the second sub-region contains multiple grille shutters.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an opened position and a closed position to provide air flow for cooling engine compartment components at the least loss in fuel economy, as closing and/or partially closing grille shutters 114 reduces an amount of air flow received through grille 112, thus reducing the aerodynamic drag on the vehicle. Maintaining the grille shutters in an open position allows for sufficient engine cooling; however, this may also increase drag on the vehicle and decrease fuel economy. On the other hand, closing the grille shutters decreases drag and improves fuel economy; however, this may not allow for sufficient engine cooling. Thus, control of the grille shutters may be based on multiple vehicle operating conditions, discussed further below. In some embodiments, the grille shutters may be used for CAC condensate control only. In this case, grille shutter operation may have little to no aerodynamic benefit.

When the grille shutters are open, electric fan 92 may be used to increase or decrease cooling ambient air flow 116 to engine components. For example, by increasing the electric fan rotation speed, the amount and rate of air flow to the engine will increase. Conversely, by decreasing the fan rotation speed, the rate of air flow to the engine decreases. In another example, the electric fan may be turned on at a low rotation speed to decrease CAC efficiency and increase CAC outlet temperature. Specifically, at low speeds, the electric fan may not be effective in cooling. However, the blades of the fan may act to resist airflow to the radiator and CAC. In this way, ambient air flow velocities directly affect CAC effectiveness and CAC outlet temperature. Thus, by changing fan rotation speed, CAC efficiency and outlet temperature may be altered. When grille shutters are closed, little cooling ambient air flow enters the grille. However, the electric fan may still operate to provide air flow. In addition to controlling rotation speed, the electric fan may also change rotation direction. The blades of the fan may be designed such that rotation in a first direction directs air flow toward engine components. In the following descriptions, this will serve as the normal or base direction for fan operation. Rotation of the fan blades in a second direction, opposite the first direction, may direct air flow away from engine components. In this way, fan rotation direction may also be used to alter the cooling air flow reaching engine components and, subsequently, CAC efficiency and outlet temperature.

In some embodiments, control system 28 may be configured to adjust opening of grille shutters 114 responsive to vehicle operating conditions. Adjusting opening of grille shutters 114 may include opening one or more of the grille shutters, closing one or more of the grille shutters, partially opening one or more of the grille shutters, partially closing one or more of the grille shutters, adjusting opening and closing timing, etc. As an example, controller 12 may be communicably connected to grille shutter system 110, and may have instructions stored thereon to adjust opening of grille shutters 114. In this way, controller 12 may adjust vehicle grille shutters by increasing or decreasing grille shutter opening.

Control system 28 may be further configured to operate electric fan 92 responsive to vehicle operating conditions. Electric fan 92 operation may include increasing the fan rotation speed, decreasing the fan rotation speed, stopping the fan rotation, reversing the fan rotation direction, adjusting rotation on/off timing, etc. As an example, controller 12 may be communicably connected to electric fan 92, and may have instructions stored thereon to adjust the rotation of electric fan 92.

Electric fan operation may be adjusted in response to a variety of system variables, including engine temperatures, vehicle driving conditions, charge air temperature at the CAC outlet (CAC outlet temperature), and outside weather conditions. Condensate formation in the CAC may include an amount of condensate and/or a condensate formation rate, where CAC outlet temperature may be one of several variables used to estimate and/or calculate condensate formation. In some embodiments, grille shutters may be adjusted in response to all or a few of the above system variables. Adjustment of the electric fan may be coordinated with grille shutter operation in order to optimize CAC condensate control, as well as engine cooling and fuel economy. For example, controller 12 may be communicably connected to both electric fan 92 and grille shutter system 110. Controller 12 may have instructions stored thereon to adjust operation of electric fan 92 or grille shutter system 110, based on the other's current condition and the above listed system variables. Operation of the electric fan and grille shutters may be in response to one of these system variables, even if other variables remain within a normal range. In this way, all variables may be assessed to determine the optimal electric fan rotation speed or direction, as well as grille shutter opening, for vehicle cooling, CAC corrosion prevention, misfire prevention, and increased fuel economy.

Figure 2A:
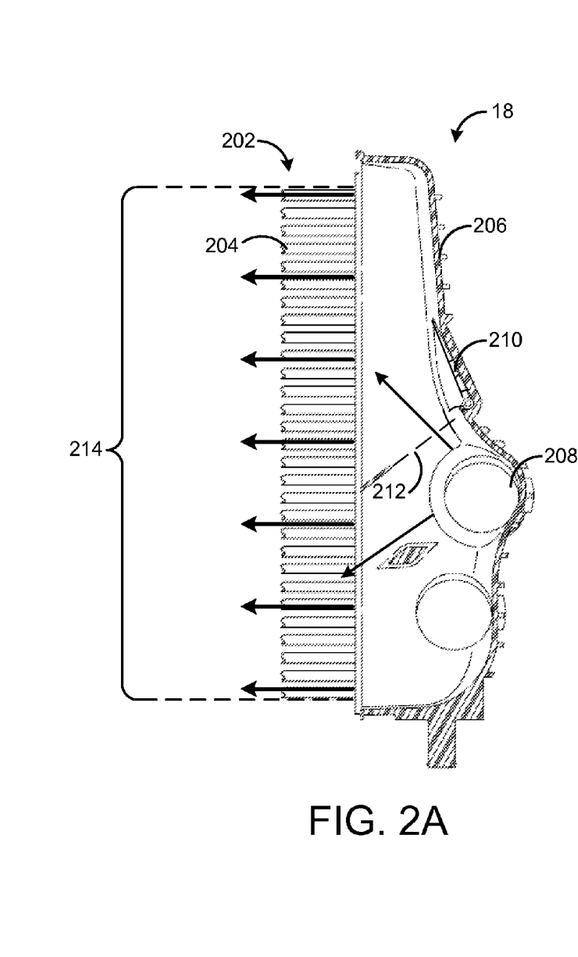
FIGS. 2A and 2B show the charge air cooler of FIG. 1 including a variable volume valve.
Figure 2B:
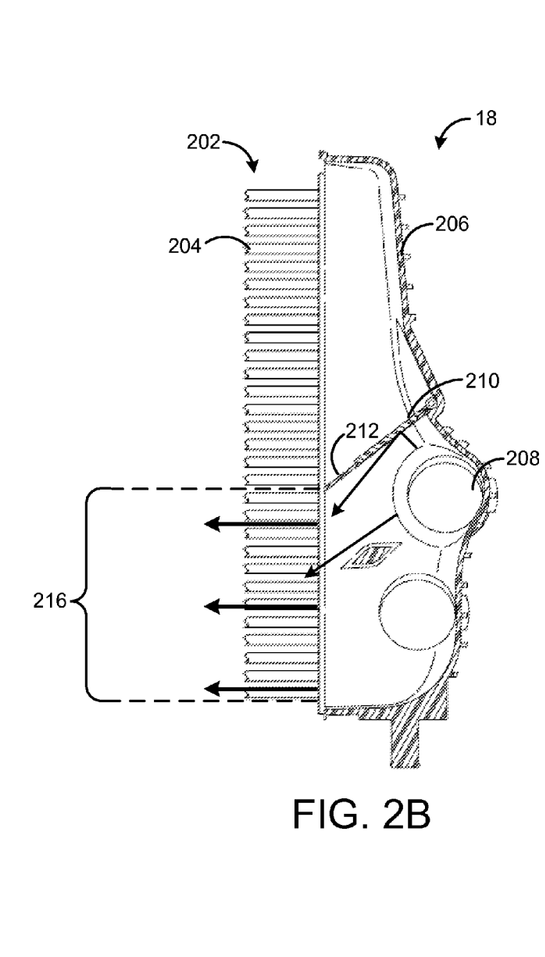

Turning now to FIGS. 2A and 2B, an inlet side of charge air cooler 18 is depicted. As depicted in both FIGS. 2A and 2B, charge air cooler 18 includes an operable thermal transfer area 202 configured to transfer heat from inside the CAC 18 to outside of the CAC 18. The CAC 18 includes a plurality of cooling tubes 204 located in the thermal transfer area 202 of CAC 18. The plurality of cooling tubes 204 are in fluidic communication with an inlet tank 206. Inlet tank 206 is configured to receive intake air via one or more inlet passages 208 coupled to an upstream region of an intake passage (not shown in FIGS. 2A and 2B). The intake air flows from the inlet tank 206 to the plurality of cooling tubes 204. After passing through the cooling tubes 204, the intake air is routed through an outlet tank (not shown) coupled to a downstream region of the intake passage. The CAC 18 may also include a variable volume charge air cooler valve 210 configured to change the operable thermal transfer area from a first volume 214 (shown in FIG. 2A) comprising a relatively large area to second volume 216 (shown in FIG. 2B) comprising a relatively small area.

Inlet tank 206 may include a divider 212 that partitions inlet tank 206 into a first portion and a second portion. Divider 212 may include one or more holes. FIG. 2A depicts valve 210 in an open position. When valve 210 is open, intake air may pass through one or more holes of divider 212 such that intake air flows through both the first and second portions of inlet tank 206 and through the first volume 214 of the CAC 18. Substantially all of the plurality of cooling tubes 204 may define the first volume 214. In one example, the CAC 18 may include 21 cooling tubes, and the first volume 214 may include all 21 cooling tubes.

FIG. 2B depicts valve 210 in the closed position. When closed, valve 210 blocks the one or more holes of divider 212. Thus, intake air only flows through the first portion of the inlet tank 206 and through the second volume 216 of the CAC 18. A portion of the plurality of cooling tubes 204 may define the second volume 216. The second volume 216 is contained wholly within the first volume 214. That is, the cooling tubes that comprise the second volume 216 also comprise a portion of the first volume 214. Therefore, when valve 210 is closed, intake air flows through only the second volume 216, and when valve 210 is open, intake air flows through the first volume 214, which contains the second volume 216. In one example, the CAC 18 may include 21 cooling tubes, and the second volume 216 may include less than 21 cooling tubes. The second volume 216 may include less than half the cooling tubes that comprise the first volume 214, such as 9 cooling tubes.

The valve 210 may be, or may be similar to, a flapper valve. The valve 210 may include a seat member (e.g., divider 212) comprising a substantially flat stationary member having one or more holes there through. A closure member, for example a flap, or plate may be configured to move a first position spaced from the seat member thereby opening the one or more holes wherein intake air is able to flow into the first volume 214, to a second position adjacent to the seat member thereby closing the one or more holes wherein intake air is able to flow into only the second volume 216.

The divider 212 may be part of the valve 210. For example, the divider 212 may be a valve seat. The divider 212 may also be a dividing line or datum, or the like, functionally dividing the CAC 18 into the two portions. Some embodiments may include two or more dividers dividing the inlet into three or more portions. In some examples one or more configurations described herein regarding the inlet tank 206 may instead, or in addition, be included in an outlet tank (not shown). Substantially all of the plurality of cooling tubes 204 may be in mutual fluidic communication with the outlet tank. It will be understood that instead, all the tubes may be in fluid communication on the inlet side and divided at the outlet side into two or more portions of tubes. A similarly configured valve may also be included in the outlet tank and function to control whether the fluid is allowed to pass or prevented from passing through a similarly configured hole.

Various embodiments may include an actuator (not illustrated) to open and to close the valve 210. The actuator may be one or more of: an electronic actuator, a vacuum controlled actuator, a mechanical pressure diaphragm, a pulse-width modulated electronic control. When the inlet air is allowed to pass through all the tubes of the charge air cooler, i.e. when the valve is open, the inlet air will also experience a drop in pressure and the valve will be exposed on both sides to the pressure of the incoming inlet air. In this way the actuator may only need to provide a motive force to open and to close the valve in order to change the valve from an open state to a close state, but may not need to provide force to keep the flap open or to keep the flap closed.

Thus, FIGS. 2A and 2B depict a charge air cooler configured to selectively direct intake air through either a first, larger volume or a second, smaller volume via modulation of a valve arranged in the charge air cooler. In some embodiments, the valve may be mechanically modulated based on intake air flow, e.g., the valve flap or plate may be kept closed by spring tension that is calibrated to match air flow, such that the valve flap opens under conditions of high air flow. Thus, during low air flow conditions, the intake air may be directed through the second volume of the charge air cooler, increasing the intake air flow velocity through the cooler to prevent condensation accumulation. In other embodiments, the valve may be controlled by a controller, such as controller 12 of FIG. 1, based on various operating conditions. For example, the valve may be open during low condensation formation conditions and commanded closed during conditions of high condensation formation.

The system illustrated in FIGS. 1 and 2A-2B provides for a charge air cooler that cools compressed intake air prior to reaching the engine. The charge air cooler may cool the compressed air by flowing cooling air over the heat exchange passages in the charge air cooler. This cooling air may be provided via ambient air drawn in through the vehicle grille, and directed to the charge air cooler by the grille shutters. As explained above with respect to FIG. 1, the grille shutters may change in position based on operating parameters in order to manage the thermal effectiveness of the charge air cooler. If the shutters become stuck in a certain position, such as in a position where ambient air is not efficiently drawn into the engine or is otherwise directed away from the charge air cooler, the ability of the charge air cooler to cool the compressed intake air may be compromised, leading to over-temperature and possible degradation of the engine and associated components.

The charge air cooler of FIGS. 1 and 2A-2B may be a variable volume charge air cooler including a valve configured to selectively modulate the operable thermal transfer area of the charge air cooler between a larger volume and a smaller volume. If the variable volume valve is degraded and will not move out of the position in which intake air directed through the smaller volume of the charge air cooler (e.g., if the valve will not move out of the closed position), adequate cooling of the compressed air may be compromised in some conditions. Further, during conditions of high mass air flow, the increased pressure introduced by the small-volume charge air cooler may stress the compressor, leading to degradation of the turbocharger.

Thus, identification of degradation to the above-described charge air cooler components may reduce degradation of the charge air cooler, engine, turbocharger, and/or additional components. To detect degradation of the grill shutters or variable volume valve, the temperature and/or pressure upstream and downstream of the charge air cooler may be monitored. The downstream pressure or temperature is different than expected given the upstream temperature or pressure and known operating conditions, degradation of the grill shutters or variable volume valve may be indicated.

Figure 3:
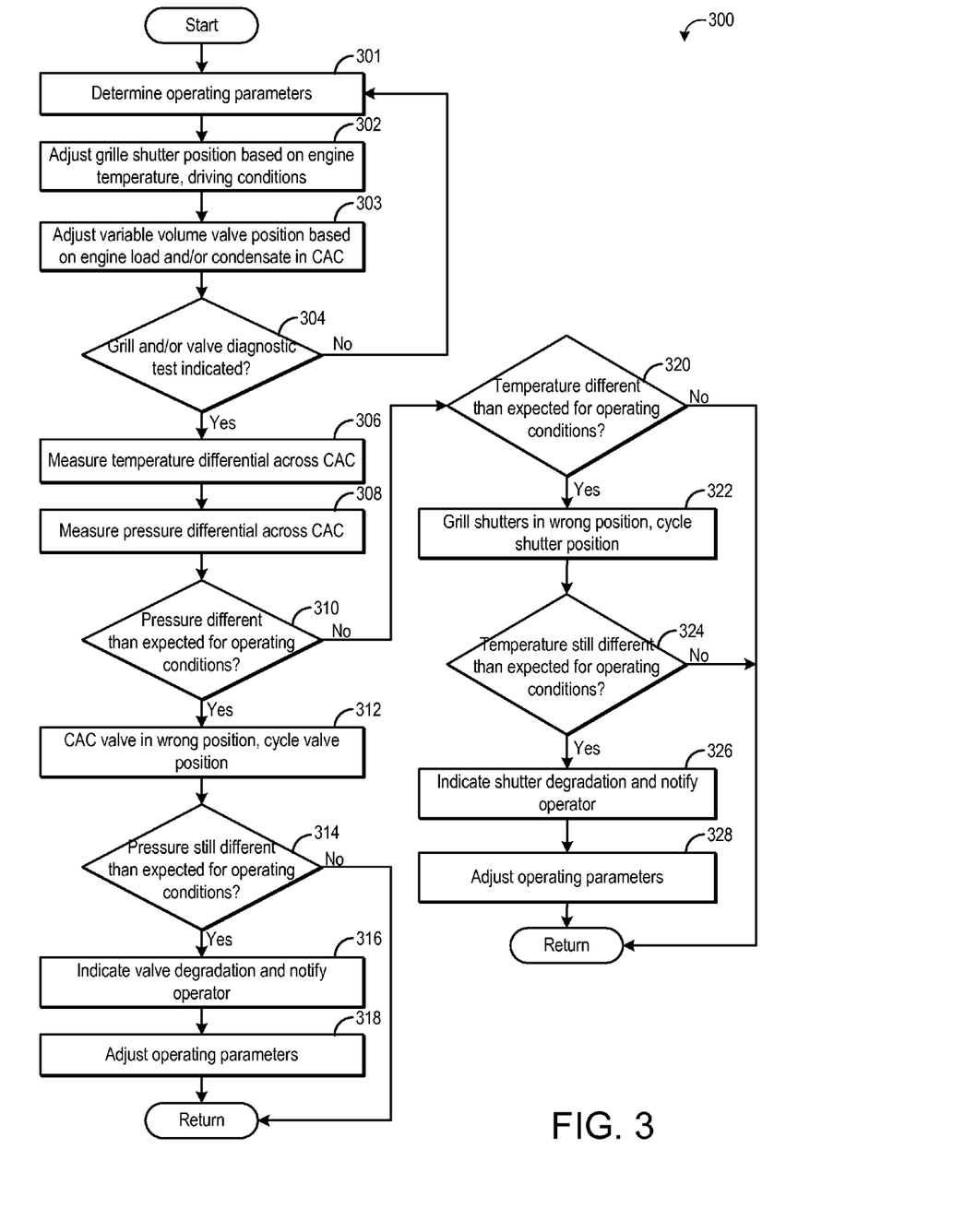
FIG. 3 is a flow diagram illustrating an example method to diagnose a charge air cooler component.

Referring now to FIG. 3, a method 300 for diagnosing degradation of a charge air cooler component is illustrated. Method 300 may be carried out by controller 12 according to instructions stored thereon. Method 300 comprises, at 301, determining operating parameters. The operating parameters may include engine speed and load, mass air flow, throttle angle, wastegate position, engine temperature, charge air cooler temperature, and other parameters. At 302, method 300 includes adjusting grille shutter position based on engine temperature, driving conditions, or other parameters. As discussed above, the position of the grille shutters may be based on engine temperature, in order to maintain the engine, charge air cooler, and other components at a desired temperature. Further, the grille shutters may be adjusted to reduce drag and increase fuel economy, which may be based on engine speed and load in some examples. At 303, the variable volume charge air cooler valve may be adjusted based on engine load, condensate in the charge air cooler, and/or other parameters. For example, the valve may be opened during high engine load and closed during low engine load conditions. In another example, the valve may be closed when condensate has accumulated in the charge air cooler, or when it is predicted that condensate is about to start accumulating (based on ambient and charge air cooler temperature, charge air cooler pressure, ambient humidity, etc.).

At 304, it is determined if the grill shutter and/or variable volume valve diagnostic test is indicated. If the engine is operating at steady speed with vehicle speed above a threshold (such as at standard highway speed) or within a speed window, the grill shutter diagnostic test may be carried out. Further, the variable volume valve diagnostic test may be carried out under most conditions, but may be more informative at higher engine loads (for example, the valve may be opened at higher loads, and thus if the valve is stuck closed, the pressure increase caused by the closed valve may be more apparent during high load). Further, the diagnostic tests may be carried out only after a predetermined time since a previous test has elapsed, such as after a certain number of engine cycles, after a certain number of engine starts, etc.

If the shutter and valve test are not indicated, method 300 returns to 301 to continue to monitor operating conditions. If one or both of the tests are indicated, method 300 proceeds to 306 to measure the temperature difference across the charge air cooler. The temperature difference may be determined by measuring ambient temperature (e.g., the temperature of the intake air upstream of the compressor) or the temperature at the inlet of the charge air cooler, and by measuring the temperature of the charge air downstream of the charge air cooler, such as the charge air cooler outlet temperature, throttle inlet temperature, or the manifold charge temperature. The temperatures may be determined based on feedback received from various engine temperature sensors. The temperature difference across the charge air cooler indicates the current cooling effectiveness of the charge air cooler, and may be compared to an expected cooling effectiveness of the charge air cooler, as will be described below. Further, the ambient temperature, cooling fan speed, and vehicle speed may be used to estimate the cooling efficiency of the charge air cooler.

At 308, the pressure difference across the charge air cooler is measured. The pressure at the inlet of the charge air cooler and at the outlet of the charge air cooler may be determined based on feedback from various engine pressure sensors. This pressure difference, or pressure drop, across the charge air cooler may indicate whether the variable volume valve is open or closed (if the valve is open, the pressure drop may be smaller than if the valve is closed, for example). Additionally, the pressure drop or the pressure at the outlet of the charge air cooler may be compared to an expected pressure during known conditions to determine what position the valve is currently in. For example, a look-up table may include expected throttle inlet pressures mapped to throttle angle and wastegate position. If the measured throttle inlet pressure (or charge air cooler outlet pressure) is different than the expected pressure, it may be indicated that the valve is not in the desired position.

Thus, at 310 it is determined if the measured pressure (pressure drop across the charge air cooler or pressure at the outlet of the cooler) is different than an expected pressure for the given operating conditions (e.g., throttle angle and wastegate position, engine load, etc.). As used herein, "different than" may include different by more than a threshold amount, for example, the pressure may be within 5% of the expected pressure and still be considered similar to the expected pressure, but if different by more than 5%, be considered a different pressure than the expected pressure. If the pressure is not different than expected, method 300 proceeds to 320, which will be explained in more detail below. If the pressure is different than expected, method 300 proceeds to 312 to indicate that the variable volume valve may be in a non-desired or non-commanded position (that is, in a position other than the position commanded by the controller) and to cycle the valve position. If the measured pressure is greater than the expected pressure, it may indicate that the valve is closed when it is desired that the valve be open. Conversely, if the measured pressure is less than expected, it may indicate that the valve is open when it is desired that the valve be closed. Cycling the valve position may include commanding the valve to one or more different positions, for example commanding the valve open and then commanding the valve closed, in order to try to move the valve out of the non-desired position.

At 314, it is determined if the pressure is still different than expected for the current operating parameters. This second position diagnosis is performed if the operating conditions have not changed enough to warrant a change in valve position, e.g., if the engine was operating with high load previously and is still operating with high load, the second diagnosis may be performed, but if the engine is now operating with low load, the second diagnosis may not be performed until conditions return to those of the first diagnosis. If it is determined at 314 that the pressure is not different than expected, method 300 returns, as the valve may have moved out of the non-desired position due to the cycling performed previously. If the pressure is still different than expected, method 300 proceeds to 316 to indicate valve degradation and notify the vehicle operator, by lighting a vehicle malfunction indicator lamp, and/or setting a diagnostic code.

At 318, operating parameters may be adjusted based on the indicated degradation. For example, if it is determined that the valve is stuck in the closed position, engine power may be reduced and/or the maximum allowable torque may be limited in order to reduce the air flow through the charge air cooler and reduce possible degradation to the turbocharger. Further, if the valve is stuck closed, charge cooling may be compromised, and thus one or more engine cooling fans may be activated and/or the fan speed may be increased. If the valve is stuck open, removal of charge air cooler condensate may be reduced. To prevent engine misfire when condensate accumulates in the charge air cooler and is swept to the engine, spark timing may be adjusted responsive to an indication that condensate in the charge air cooler is moving to the engine (e.g., based on feedback from a humidity sensor or intake oxygen sensor, or based on a condensate model that estimates accumulated condensate based on operating conditions). Additionally or alternatively, throttle position may be adjusted to change the air velocity through the charge air cooler to prevent condensate accumulation. Method 300 then returns.

Returning to 310, if it is determined that the pressure is not different than expected, method 300 proceeds to 320 to determine if the temperature measured at 306 is different than expected. The difference between the upstream and downstream charge air cooler temperatures may be compared to an expected temperature difference for the known operating conditions. For example, a look-up table may map mass air flow, engine speed, and/or engine load to an expected thermal efficiency of the charge air cooler. In other words, the look-up table may indicate by what degree the charge air cooler is expected to cool the compressed intake air for a given mass air flow, engine load, or engine speed. If the determined temperature difference indicates that the cooler is not cooling the air by a similar degree as expected, degradation of grille shutter position may be indicated. Degradation of the variable volume valve may also contribute to an expected temperature difference across the charge air cooler, and thus in some embodiments, the difference between the expected and measured temperature difference may be determined when diagnosing the valve position as well. However, as the position of the grille shutter or shutters does not affect the pressure of the intake air across the charge air cooler, a detected temperature difference that does not include a detected pressure difference may be used to diagnose the grille shutters.

Thus, if the temperature difference is not different than expected, method 300 returns, as no degradation of the grille shutters or variable volume valve is indicated. If the temperature is different than expected, method 300 proceeds to 322 to indicate that the grille shutter or shutters may be in a non-desired position and to cycle the shutter position, for example by commanding the shutters to one or more different positions, to attempt to move the shutters out of the non-desired position. At 324, it is determined if the temperature difference is still different that the expected temperature difference. If the temperature difference is not different than expected, method 300 returns, as the shutters have moved out of the non-desired position. If the temperature difference is still different than expected, method 300 proceeds to 326 to indicate grille shutter degradation and notify a vehicle operator by lighting a malfunction indicator lamp, and/or setting a diagnostic code. At 328, one or more operating parameters may be adjusted based on the degradation. For example, if the shutters are not providing desired cooling to the charge air cooler, engine power may be reduced and/or engine fan speed may be increased. If the shutters are providing excess cooling to the charge air cooler, a portion of the intake air may be bypassed around the charge air cooler and/or the engine cooling fan speed may be reduced. Method 300 then returns.

Thus, method 300 provides for adjusting operating parameters in response to detected degradation of a variable volume charge air cooler valve, or in response to degradation of the grille shutters. If either the variable volume valve or the grille shutter or shutters become stuck in a given position, desired charge air cooling may be comprised. Thus, the two types of degradation may both be identified based on the cooling effectiveness (e.g., temperature drop across the charge air cooler) being different than expected for the given operating conditions. To differentiate between the two types of degradation, the pressure drop across the charge air cooler may also be measured. An absence of an unexpected pressure drop indicates that the grille shutters may be degraded, while the presence of an unexpected pressure drop indicates that the variable volume valve may be degraded. Upon detection of degradation, various operating parameters may be adjusted to reduce possible engine or component degradation, such as lowering engine torque. By lowering the maximum allowable engine torque, high temperature conditions, which may degrade the engine when charge air cooling is compromised, may be reduced, thus lowering the likelihood of engine degradation.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   determining degradation of a grille shutter based on a temperature difference across a charge air cooler determined via a controller;
   indicating the grille shutter is in a non-commanded position if the temperature difference is different than an expected temperature difference, and
   adjusting engine torque or an engine cooling fan speed in response to the determined degradation of the grille shutter.

2. The method of claim 1, wherein the temperature difference comprises a difference between a sensed ambient temperature and a sensed throttle inlet temperature.

3. The method of claim 1, further comprising:
   if the grille shutter is the non-commanded position, then commanding a change in grille shutter position;
   determining if the grille shutter is still in the non-commanded position based on a second temperature difference across the charge air cooler determined via the controller; and
   if the grille shutter is still in the non-commanded position, indicating degradation of the grille shutter.

4. A method, comprising:
   determining degradation of a variable volume charge air cooler valve based on a pressure difference across a charge air cooler;
   indicating the variable volume charge air cooler valve is in a non-commanded position if the pressure difference is different than an expected pressure difference, and
   adjusting engine torque or an engine cooling fan speed in response to the determined degradation of the variable volume charge air cooler valve.

5. The method of claim 4, wherein the pressure difference comprises a difference between a sensed charge air cooler inlet pressure and a sensed throttle inlet pressure.

6. The method of claim 4, further comprising:
   if the variable volume charge air cooler valve is the non-commanded position, then commanding a change in variable volume charge air cooler valve position;
   determining if the variable volume charge air cooler valve is still in the non-commanded position based on a second pressure difference across the charge air cooler; and
   if the variable volume charge air cooler valve is still in the non-commanded position, indicating a degraded variable volume charge air cooler valve.

7. The method of claim 4, wherein the degraded variable volume charge air cooler valve is further determined based on a temperature difference across the charge air cooler.

8. A method, comprising:
   in response to an engine operating condition, determining a pressure difference across a charge air cooler and a temperature difference across a charge air cooler via a controller;
   if a pressure drop across the charge air cooler is different than expected, then indicating degradation of the variable volume charge air cooler valve;
   if the pressure drop is not different than expected, then indicating degradation of the grille shutter based on a temperature drop across the charge air cooler; and
   adjusting engine torque or an engine cooling fan speed based on the indicated degradation.

9. The method of claim 8, further comprising adjusting a position of the variable volume charge air cooler valve based on engine load.

10. The method of claim 8, further comprising adjusting a position of the grille shutter based on charge air cooler temperature.

11. The method of claim 8, wherein the engine operating condition comprises steady state engine operation above a threshold vehicle speed.

12. The method of claim 8, wherein the engine operating condition comprises a given throttle angle and wastegate position.

* * * * *